United States Patent
Mynar (10) Patent No.: US 10,320,224 B2
(45) Date of Patent: Jun. 11, 2019

(54) WIRELESS CHARGING TRANSMITTER AND METHOD FOR OPERATING THE WIRELESS CHARGING TRANSMITTER

(71) Applicant: NXP B.V., Eindhoven (NL)

(72) Inventor: Zbynek Mynar, Roznov Pod Radhostem (CZ)

(73) Assignee: NXP B.V., Eindhoven (NL)

( * ) Notice: Subject to any disclaimer, the term of this patent is extended or adjusted under 35 U.S.C. 154(b) by 215 days.

(21) Appl. No.: 15/604,882

(22) Filed: May 25, 2017

(65) Prior Publication Data
US 2018/0342889 A1   Nov. 29, 2018

(51) Int. Cl.
*H02J 7/00* (2006.01)
*H02J 7/02* (2016.01)
*H02J 50/12* (2016.01)
*H02J 50/10* (2016.01)

(52) U.S. Cl.
CPC .............. *H02J 7/025* (2013.01); *H02J 50/10* (2016.02); *H02J 50/12* (2016.02)

(58) Field of Classification Search
CPC .. H02J 5/005; H02J 50/05; H02J 50/10; H02J 7/025
USPC ........................................................ 320/108
See application file for complete search history.

(56) References Cited

U.S. PATENT DOCUMENTS

| | | | |
|---|---|---|---|
| 8,581,444 B2 | 11/2013 | Urano | |
| 2012/0286726 A1 | 11/2012 | Kim et al. | |
| 2013/0088088 A1 | 4/2013 | Wambsganss et al. | |
| 2015/0222139 A1* | 8/2015 | Petersen | H02J 7/025 320/108 |

OTHER PUBLICATIONS

Zhao, R., "Phase Shift Control Based Maximum Efficiency Point Tracking in Resonant Wireless Power System and its Realization", Department of Electronic and Electrical Engineering, 2016 IEEE.
Gati, Eleni et al., "Variable Frequency Controller for Inductive Power Transfer in Dynamic Conditions;" IEEE Transactions on Power Electronics, Feb. 1, 2017, pp. 1684-1696, vol. 32, No. 2, IEEE, Piscataway, NJ, USA.

(Continued)

*Primary Examiner* — Paul Dinh
(74) *Attorney, Agent, or Firm* — Daniel D. Hill (57) ABSTRACT

A wireless charging transmitter has a phase-shift controlled inverter, a capacitor, a transmitter coil, and a control circuit. The phase-shift controlled inverter has an input for receiving a phase-shift signal, and first and second output terminals for providing an inverter output voltage. The capacitor has a first terminal coupled to the first output terminal of the phase-shift controlled inverter, and a second terminal. The transmitter coil having a first terminal coupled to the second terminal of the capacitor, and a second terminal coupled to the second terminal of the phase-shift controlled inverter. The control circuit has an input coupled to the second terminal of the capacitor for sampling a capacitor voltage of the capacitor, and an output for providing the phase-shift signal corrected for the phase error. The control circuit determines the phase error of the capacitor voltage relative to a phase of an inverter output voltage to ensure the wireless charging transmitter operates in resonance.

20 Claims, 4 Drawing Sheets

(56) References Cited

OTHER PUBLICATIONS

Jang, Yungtaek et al., "A Contactless Electrical Energy Transmission System for Portable-Telephone Battery Chargers", INTELEC, Twenty-Second International Telecommunications Energy Conference, Sep. 10, 2000, pp. 726-732, IEEE, Piscataway, NJ, USA.
Kim, Minkook et al., "Design and Control of Inductive Power Transfer System for Electric Vehicles Considering Wde Variation of Output Voltage and Coupling Coefficient", 2017 IEEE Applied Power Electronics Conference and Exposition (APEC), Mar. 26, 2017, pp. 3648-3653, IEEE, Piscataway, NJ, USA.

\* cited by examiner

WIRELESS CHARGING TRANSMITTER AND METHOD FOR OPERATING THE WIRELESS CHARGING TRANSMITTER

BACKGROUND

Field

This disclosure relates generally to wireless charging and more specifically to a wireless charging transmitter and method for operating the wireless charging transmitter.

Related Art

A wireless charging system allows battery charging without the use of a physical connection between the charger and the device being charged. Wireless charging is more convenient and the wires and connectors are eliminated. In most wireless charging systems, inductive coupling between a transmitter coil and a receiver coil is used to transfer power. However, wireless charging is not as efficient as wired charging. Operation at resonant frequency improves efficiency, increases maximal charging distance between receiver and transmitter coils, and lowers the electromagnetic interference caused by the power transfer. Prior efforts to operate at a resonant frequency have been too slow to react to changes or use high-cost coil current measurement and LC phase detection hardware with a Schmitt trigger. Also, some prior resonance circuits may be overly complex, requiring high speed communication with a receiver. Therefore, a need exists for a wireless charger that is more efficient while also being simpler and less expensive.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a wireless charging transmitter that tracks a resonant frequency by measuring a capacitor voltage of a capacitor connected in series with the transmitter coil and across the output terminals of a phase shift controlled full bridge inverter. A processor receives a level shifted capacitor voltage from the capacitor and uses an analog-to-digital converter and a phase error detection algorithm to determine a phase of the capacitor voltage relative to an output voltage of the inverter. The wireless charging transmitter tracks and dynamically corrects the phase error for resonance operation during a charging operation to provide the optimum charging frequency for receiver load and for the orientation of the transmitter coil to the receiver coil. Also, the wireless charging transmitter will correct the charging frequency if the orientation between the transmitter and receiver coil changes, or the receiver load changes, to always provide optimum resonance operation.

In one embodiment, there is provided a wireless charging transmitter comprising: a phase-shift controlled inverter having an input for receiving a phase-shift signal, and first and second output terminals for providing an inverter output voltage; a capacitor having a first terminal coupled to the first output terminal of the phase-shift controlled inverter, and a second terminal; a coil having a first terminal coupled to the second terminal of the capacitor, and a second terminal coupled to the second terminal of the phase-shift controlled inverter; and a control circuit having an input coupled to the second terminal of the capacitor for sampling a capacitor voltage of the capacitor, the control circuit determining a phase error of the capacitor voltage relative to a phase of an inverter output voltage, and an output for providing the phase-shift signal corrected for the phase error. The phase-shift controlled inverter may be characterized as being a phase-shift controlled full bridge inverter comprising metal-oxide semiconductor (MOS) transistors. The level shifter level may shift the capacitor voltage to have a lower amplitude. The wireless charging transmitter may further comprise a level shifter having an input coupled to the second terminal of the capacitor, and an output for providing a level shifted capacitor voltage. The control circuit may comprise: an analog-to-digital converter having an input coupled to receive the level shifted capacitor voltage, and an output for providing a digital representation of the level shifted capacitor voltage; a phase error detector having an input coupled to the output of the analog-to-digital converter, the phase error detector determining the phase error of the capacitor voltage relative to the phase of the inverter output voltage; a proportional-integral (PI) controller having an input coupled to the output of the phase error detector, and an output for providing a phase error control signal; and a pulse width modulation (PWM) circuit having a first input for receiving an input signal, a second input coupled to the output of the PI controller for receiving the phase error control signal, and an output for providing the phase-shift signal corrected for the phase error. The analog-to-digital converter may be used to sample the digital representation of the level shifted capacitor voltage one of either 8 or 16 times per a PWM period. The capacitor voltage may be sampled and the phase error determined dynamically during operation of the wireless charging transmitter. The phase error may be zero when a phase difference between the capacitor voltage the inverter output voltage is 90 degrees. The control circuit may be implemented in a microcontroller unit (MCU).

In another embodiment, there is provided, a wireless charging transmitter comprising: a phase-shift controlled full bridge inverter having an input for receiving a phase-shift signal, and first and second output terminals for providing an inverter output voltage; a capacitor having a first terminal coupled to the first output terminal of the phase-shift controlled full bridge inverter, and a second terminal; a coil having a first terminal coupled to the second terminal of the capacitor, and a second terminal coupled to the second terminal of the phase-shift controlled inverter; a voltage level shifting circuit having an input coupled to the second terminal of the capacitor, and an output for providing a level shifted capacitor voltage; and a control circuit having an input coupled to the second terminal of the voltage level shifting circuit for sampling the level shifted capacitor voltage, the control circuit determining a phase error of the capacitor voltage relative to a phase of an inverter output voltage, and an output for providing the phase-shift signal corrected for the phase error. The control circuit may comprise: an analog-to-digital converter having an input coupled to receive the level shifted capacitor voltage, and an output for providing a digital representation of the level shifted capacitor voltage; a phase error detector having an input coupled to the output of the analog-to-digital converter, the phase error detector determining the phase error of the capacitor voltage relative to the phase of the inverter output voltage; a proportional-integral (PI) controller having an input coupled to the output of the phase error detector, and an output for providing a phase error control signal; and a pulse width modulation (PWM) circuit having a first input for receiving an input signal, a second input coupled to the output of the PI controller for receiving the phase error control signal, and an output for providing the phase-shift signal corrected for the phase error. The analog-to-digital converter may sample the digital representation of the level shifted capacitor voltage one of either 8 or 16 times per a PWM period. The capacitor voltage may be sampled and the phase error determined dynamically during operation of the wireless charging transmitter. The phase error may be zero when a phase difference between the capacitor voltage the inverter output voltage is 90 degrees. The control circuit may be implemented in a microcontroller unit (MCU).

In yet another embodiment, there is provided, a method for operating an inductive wireless charging transmitter in resonance, the inductive wireless charging transmitter comprising a phase-shift controlled full bridge inverter for switching an input signal to a transmitter coil and a capacitor coupled together in series, the method comprising: sampling the capacitor voltage using an analog-to-digital converter to produce a plurality of samples; determining a phase error of the capacitor voltage using the plurality of samples; and correcting a phase of the input signal using the phase error and providing the phase corrected input signal to be used by the phase-shift controlled full bridge inverter. The method may further comprise level shifting the capacitor voltage before sampling the capacitor voltage with the analog-to-digital converter. The method may be performed dynamically during operation of the wireless charging transmitter. The phase error may be zero when a phase difference between the capacitor voltage the inverter output voltage is 90 degrees. The method may further comprise averaging the plurality of samples before determining the phase error of the voltage using the plurality of samples.

Figure 1:
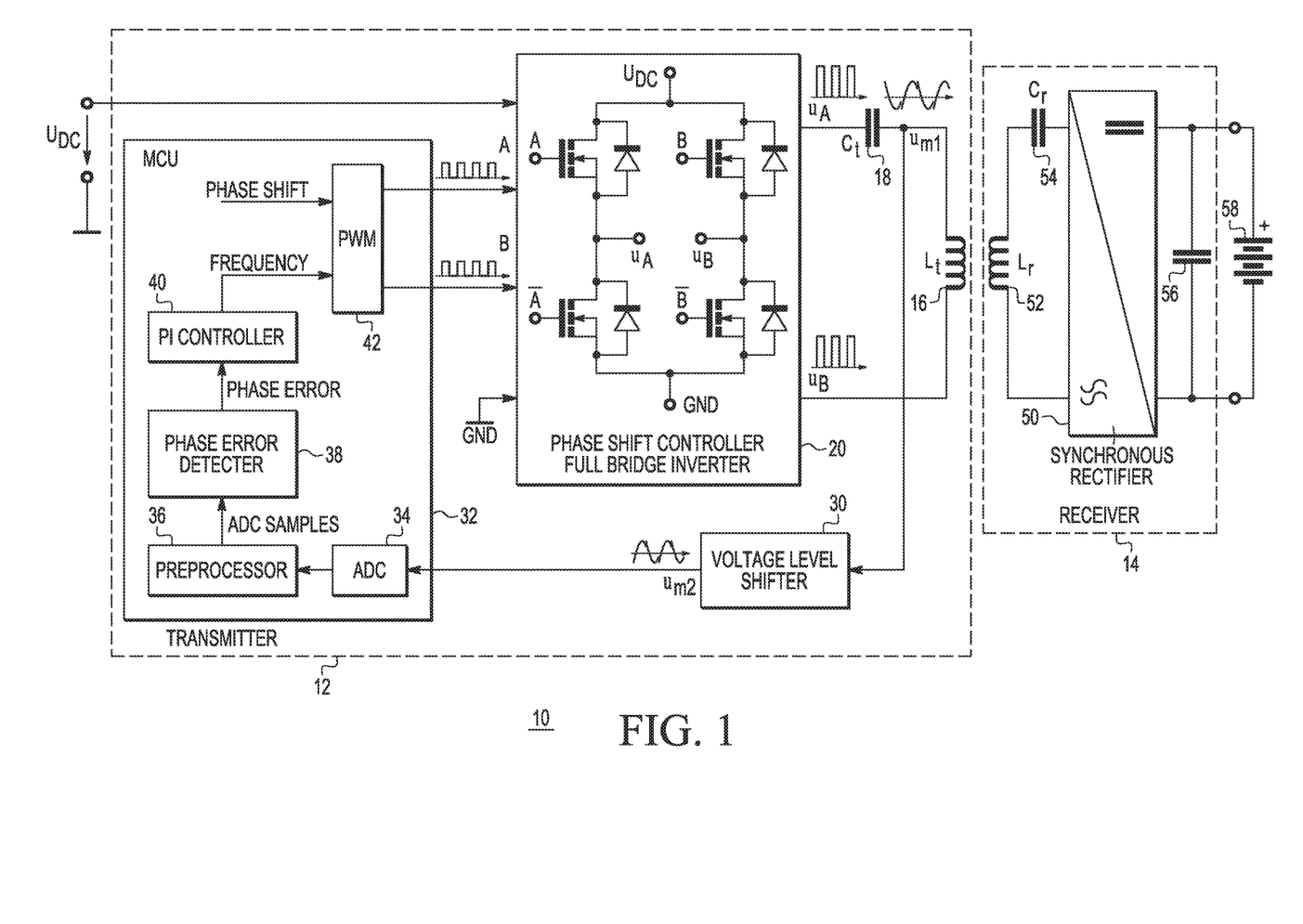
FIG. 1 illustrates a wireless charging transmitter in accordance with an embodiment.

FIG. 1 illustrates a wireless charging transmitter 12 in accordance with an embodiment. Wireless charging transmitter 12 includes transmitter coil 16, capacitor 18, phase-shift controlled full bridge inverter 20, voltage level shifting circuit 30, and processor 32. Full bridge inverter 20 is a conventional phase-shift controlled full bridge inverter and includes transistors 22, 24, 26, and 28. Processor 32 includes analog-to-digital converter (ADC) 34, preprocessor 36, phase error detector 38, proportional-integral (PI) controller 40, and pulse width modulation (PWM) circuit 42. Wireless charging transmitter 12 is illustrated with a receiver 14 in FIG. 1 to provide an inductive wireless charging system 10. Receiver 14 includes receiver coil 52, capacitors 54 and 56, synchronous rectifier 50, and battery 58. Receiver 14 may be part of a battery powered device such as a mobile phone, laptop or notebook computer, portable gaming console, or the like.

In transmitter 12, transmitter coil 16 is illustrated as an inductor having an inductance labeled $L_t$. Capacitor 18 has a capacitance labeled $C_t$ and is connected in series with transmitter coil 16. A first terminal of capacitor 18 is connected to a first output terminal labeled $u_A$ of full bridge inverter 20, and second terminal of capacitor 18 is connected to a first terminal of transmitter coil 16. A second terminal of transmitter coil 16 is connected to a second output terminal of inverter 20 labeled $u_B$. Voltage level shifting circuit 30 has an input connected to the second terminal of capacitor 18 for receiving capacitor voltage $u_{m1}$, and an output for providing a level shifted voltage labeled $u_{m2}$. Processor 32 has an input for receiving level shifted voltage $u_{m2}$, and first and second outputs for providing input signals labeled A and B to inputs of inverter 20. In the illustrated embodiment, processor 32 is a microcontroller unit (MCU). However, in other embodiments, processor 32 may be another type of processor including, for example, a microprocessor, a digital signal processor, or the like.

In phase-shift controlled full bridge inverter 20, transistors 22, 24, 26, and 28 are N-channel metal-oxide semiconductor (MOS) transistors. In other embodiments, a different type of transistor may be used. Transistor 22 has a drain connected to receive a power supply voltage labeled $U_{DC}$, a gate connected to receive an input signal labeled $u_A$, and a source connected to an output terminal for providing output signal $u_A$. Transistor 24 has a drain connected to the source of transistor 22, a gate for receiving an overbarred, or overlined, input signal $u_A$, and a source connected a power supply terminal labeled GND. Note that the overbar indicates the signal with the overbar is a complement of a signal with the same name but lacking the overbar. Transistor 26 has a drain connected to $U_{DC}$, a gate for receiving input signal $u_B$, and a source for providing output signal $u_B$. Transistor 28 has a drain connected to the source of transistor 26, a gate for receiving $u_B$ overbar, and a source connected to GND. In the illustrated embodiment, power supply voltage $U_{DC}$ is a positive DC (direct current) voltage and GND is ground. In other embodiments, the power supply voltage may be different.

In processor 32, ADC 34 has an input for receiving level shifted voltage $u_{m2}$, and an output. Preprocessor 36 has an input connected to the output of ADC 34, and an output for providing ADC SAMPLES. Phase error detector 38 has input connected to the output of preprocessor 36, and an output for providing PHASE ERROR. Note that preprocessor 36 and phase error detector 38 may be implemented in software. PI controller 40 has an input connected to the output of phase error detector 38, and an output. PWM circuit 42 has a first input for receiving a PHASE-SHIFT signal, a second input connected to the output of PI controller 40 for receiving a signal labeled FREQUENCY. Voltage level shifting circuit 30 may be implemented as part of MCU 32 or separately from MCU 32.

During operation, MCU 32 samples a capacitor voltage of capacitor 18, and determines a phase error of the capacitor voltage relative to a phase of an inverter output voltage. The phase-shift signal input to inverter 20 is corrected using the phase error. More specifically, continuous resonance frequency tracking is achieved by controlling the phase between the output voltage of phase-shift controlled inverter 20 and the voltage $u_{m1}$ between serially-connected resonant transmitter coil 16 and capacitor 18. The phase of the inverter output voltage $u_A$ is generated by PWM circuit 42. Voltage $u_{m1}$ is level shifted by voltage level shifting circuit 30 to become voltage $u_{m2}$. A phase-locked loop algorithm is used in phase error detector 38 to maintain the output frequency of PWM 42 at the resonant frequency determined as $\pi/2$ phase difference between the two input signals of PWM 42. In the illustrated embodiment, a synchronous demodulation phase-detection algorithm is used. The synchronous demodulation phase-detection algorithm provides relatively high performance, noise immunity to higher harmonics while having low computational requirements.

A serial inductive-capacitive (LC) circuit has a low real-only impedance at the resonance frequency $f_0=1/(2\pi\sqrt{LC})$, which is accompanied by high coil current and high voltage (amplification depends on LC circuit quality), and thus generated magnetic field. Efficient power transfer can take place in a second magnetically coupled LC circuit positioned nearby and tuned to substantially the same resonance frequency $f_0$. Both transmitter 12 and receiver 14 are based on a serial resonant LC circuit $L_tC_t$ and $L_rC_r$. Power is transferred between transmitter coil 16 and receiver coil 52 through magnetic coupling. The AC power signal creates a magnetic field at the transmitter side that is generated by a DC/AC inverter. In the disclosed embodiment, phase-shift controlled full-bridge inverter 20 is used. Inverter 20 is controlled by signals from PWM circuit 42. MCU 32 is configured to initiate and control power transfer between transmitter coil 16 and receiver coil 52. Generally, transmitted power is controlled by signals PHASE SHIFT and FREQUENCY input into PWM 42. A transmitted magnetic field from transmitter coil 16 can be detected by nearby receiver coil 52. An AC current is generated in receiver coil 52 and rectified by a conventional synchronous rectifier 50.

Figure 2:
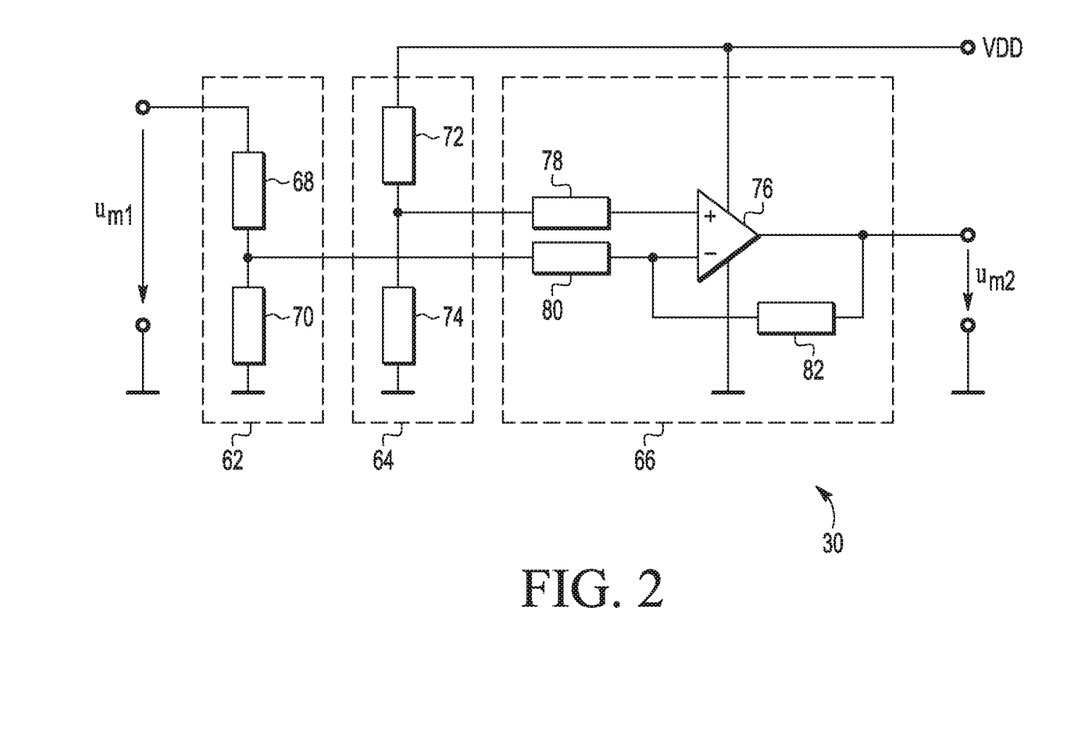
FIG. 2 illustrates the voltage level shifting circuit of FIG. 1 in more detail.

FIG. 2 illustrates the voltage level shifting circuit 30 of FIG. 1 in more detail. Voltage level shifting circuit 30 includes voltage dividers 62 and 64, and amplifier circuit 66. Voltage divider 62 includes resistors 68 and 70 and voltage divider 64 includes resistors 72 and 74. Amplifier 66 includes amplifier circuit 76 and resistors 78, 80, and 82. Voltage level shifting circuit 30 is used if voltage $u_{m1}$ is too high for the range of ADC 34. Generally, voltage level shifting circuit 30 compares the voltage $u_{m1}$ to a supply voltage $V_{DD}$ of MCU 32. If $u_{m1}$ is higher than $V_{DD}$, amplifier circuit 76 causes the voltage $u_{m2}$ at the output of amplifier circuit 76 to decrease. Conversely, if $V_{DD}$, is higher than $u_{m1}$, amplifier circuit 76 causes to the output voltage $u_{m2}$ of amplifier circuit 76 to increase, thereby providing voltage $u_{m2}$ within a predetermined voltage range.

Figure 3:
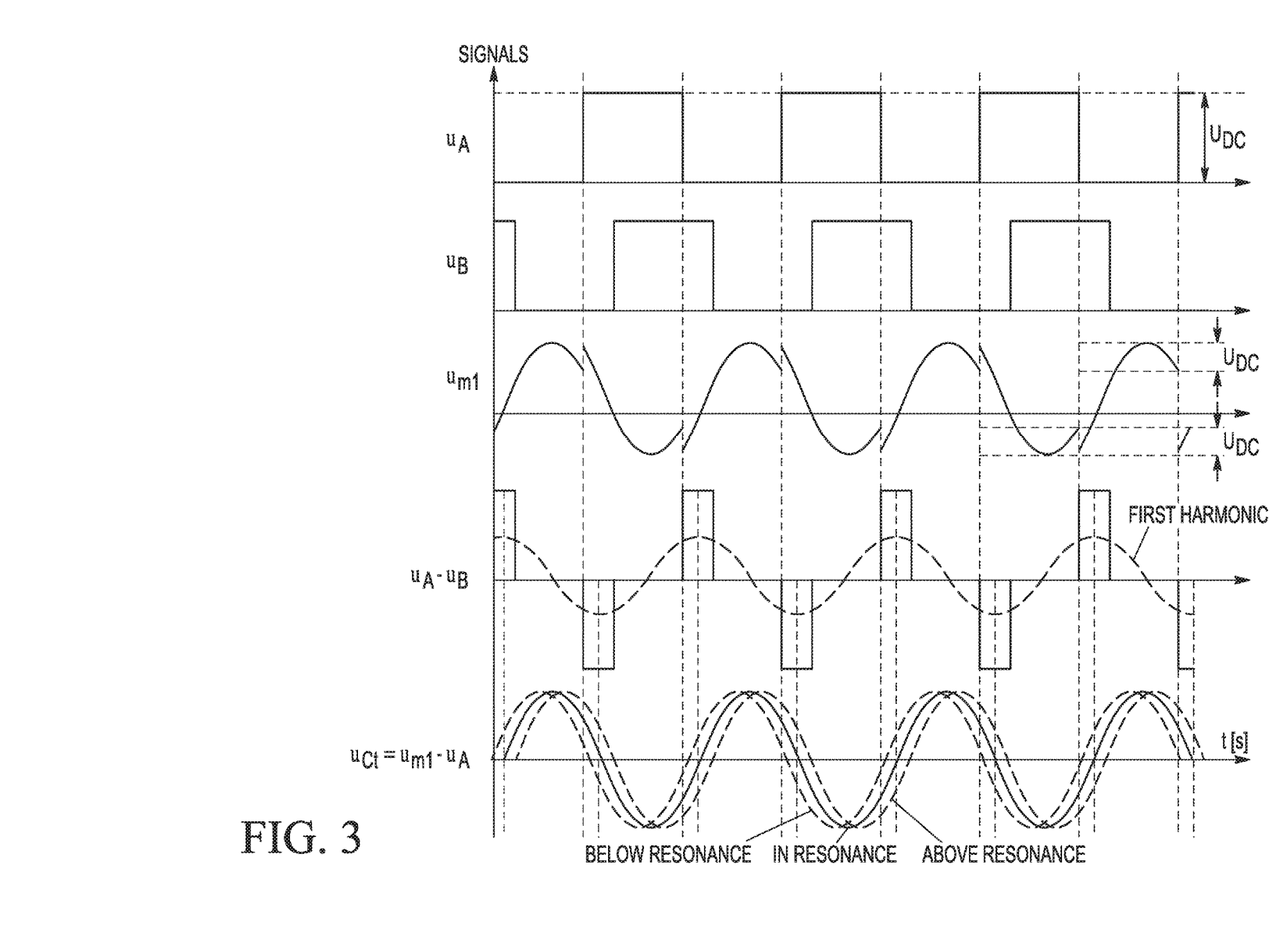
FIG. 3 illustrates waveforms of various signals in the wireless charging transmitter of FIG. 1.

FIG. 3 illustrates waveforms of various signals in the wireless charging transmitter of FIG. 1.

As can be seen in FIG. 3 for capacitor voltage $u_{Ct}$, the phase error signal PHASE ERROR input to PI controller 40 is equal to zero at the frequency with highest efficiency and power transfer, that is, the resonant frequency. The resonant frequency may not be constant and mainly depends on coupling a coefficient $\kappa=L_m/\sqrt{(L_t\,L_r)}$ and the load comprising receiver battery 58. For the best power transfer, it is desirable to track the resonance frequency continuously as both distance and orientation of the coils and load may vary during power transfer.

Resonance frequency tracking begins with measurement of capacitor voltage $u_{m2}$ using ADC 34. In FIG. 3, inverter 20 outputs voltages $u_A$ and $u_B$, and the voltage $u_{m1}$ is used to reconstruct the capacitor voltage by subtraction of voltage $u_A$. As the measured voltage $u_{m1}$ may be too high to be measured directly by ADC 34, it may be necessary to shift the level of voltage $u_{m1}$ as discussed above. Note that it is also possible to use a differential measurement of the voltage of capacitor 18, rather than a single-ended measurement, which would eliminate the $u_A-u_B$ voltage subtraction, that may be previously conducted by preprocessor 36, but would require more complex hardware. Subtraction of signal $u_A$ is relatively easy, because signal $u_A$ is generated by PWM 42 and thus known or easily determined.

Illustrated in FIG. 3 are steep transitions of capacitor 18 voltage $u_{m1}$ at the rising edges of signal $u_A$. The steep transitions are due to phase shift switching of full bridge inverter 20. The steep transitions do not appear in the coil current due to magnetic coupling being used instead of capacitive coupling for power transfer. To remove the steep transitions, only the amplitude of $U_{DC}$ is measured and subtracted from the first half of all samples, thus $$u'_{Ct}(k) = u_{m2}(k) - U_{DC},$$
$$\vdots$$
$$u'_{Ct}\!\left(k+\frac{n}{2}-1\right) = u_{m2}\!\left(k+\frac{n}{2}-1\right) - U_{DC},$$
$$u'_{Ct}(k+n/2) = u_{m2}(k+n/2),$$
$$\vdots$$
$$u'_{Ct}(k+n) = u_{m2}(k+n),$$

where $u'_{Ct}$ is the sampled capacitor voltage of capacitor 18, k is the number of samples and n is the total number of samples per PWM period. This can be done by direct measurement of DC input voltage or by calculation of the difference between the first and the second half of all samples for zero PWM phase shift.

Figure 4:
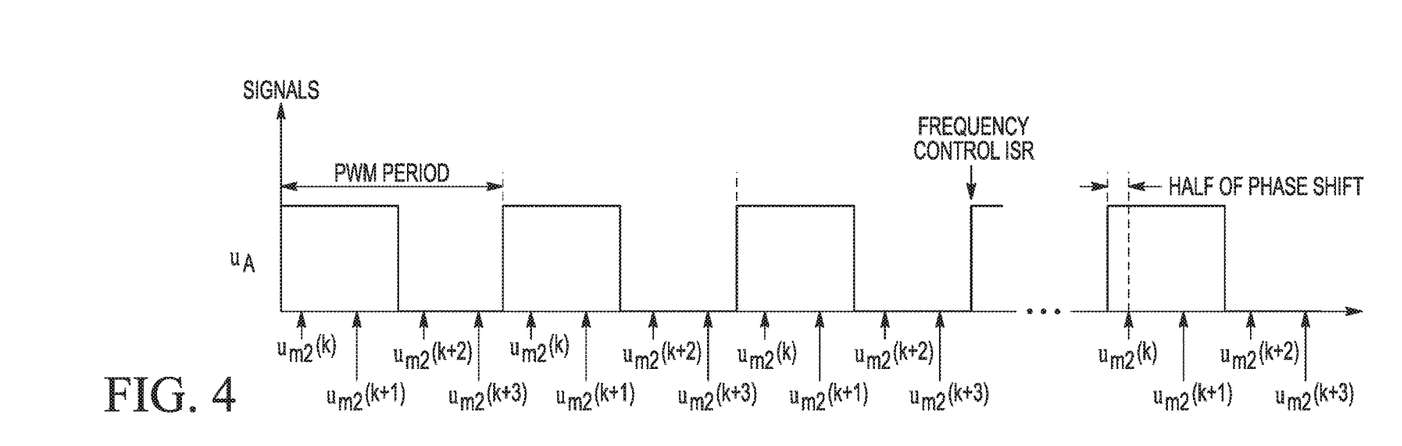
FIG. 4 illustrates one example embodiment of sampling the capacitor voltage of the wireless charging transmitter of FIG. 1.
Figure 5:
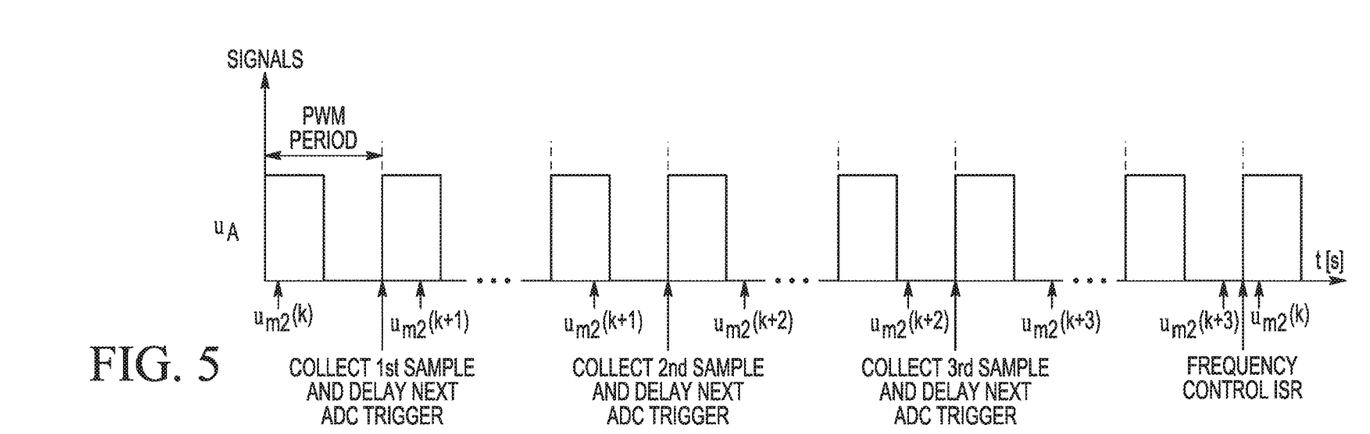
FIG. 5 illustrates another example embodiment of sampling the capacitor voltage of the wireless charging transmitter of FIG. 1.

Use of ADC 34 for sampling instead of direct hardware processing, such as with a Schmitt trigger, provides the advantage of lower hardware cost, but also limits maximal power transfer frequency, because fast ADCs can generally achieve sampling periods of hundreds of nanoseconds and at least two samples per first harmonic period are theoretically necessary (practically at least four). The disclosed embodiment is however designed for wireless charging solutions where a frequency of up to 200 kHz is expected, and either 4, 8, or 16 samples per harmonic period may be taken. Preferably, either 8 or 16 samples per harmonic period are taken. Two embodiments for sampling $u_{m2}$ are illustrated in FIG. 4 and FIG. 5 and will be discussed later.

Once the voltage of capacitor 18 is sampled and reconstructed, its relative phase towards the inverter output voltage can be determined using, for example, a synchronous detection algorithm in phase error detector 38. In case of the presence of a DC value $U_0$ and higher harmonics (especially third harmonic with amplitude $U_3$) the capacitor voltage $u_{Ct}$ can be expressed as $$u_{Ct} = U_0 + U_1\sin(\omega t+\theta) + U_3\sin(3\,\omega t+3\theta) = U_0 + U_1\sin\omega t\cos\theta + U_1\sin\theta\cos\omega t + 3U_3\sin\omega t\cos\theta + 3U_3\sin\theta\cos\omega t + 4U_3\sin^3\omega t\cos^3\theta + 12U_3\sin^2\omega t\cos^2\theta\sin\theta\cos\omega t + 12U_3\sin\omega t\cos\theta\sin^2\theta\cos^2\omega t + 4U_3\sin^3\theta\cos^3\omega t,$$

where $\omega$ is capacitor voltage frequency and $\theta$ is its phase relative to inverter output voltage first harmonic $\sin\omega t$. Thanks to the fact that the inverter output frequency $\omega$ and phase are always known, it is possible to perform synchronous demodulation as $$u_{Ct}\sin\omega t = U_0\sin\omega t + \frac{U_1}{2}\cos\theta - \frac{U_1}{2}\sin2\omega t\cos\theta + \frac{U_1}{2}\sin2\omega t\sin\theta + \frac{3U_3}{2}\cos\theta - \frac{3U_3}{2}\sin2\omega t\cos\theta + \frac{3U_3}{2}\sin2\omega t\sin\theta + \ldots$$

After filtration by a low pass filter (not shown) the phase error PHASE ERROR from the output of phase error detector 38 is given by $$\text{PHASE ERROR} = LPF\{u_{C_t}\sin\omega t\} = \left(\frac{U_1}{2} + \frac{3U_3}{2}\right)\cos\theta,$$

The PHASE ERROR signal includes information about the capacitor voltage phase and is used to generate output signal FREQUENCY provided by PI controller 40. The described phase detection is independent of DC value and higher harmonics. Because samples from ADC 34 are always obtained at the same place each phase, the sin ωt values are always constant and thus can be stored in a table. Low pass filtering can be done by averaging of $u_{C_t}$ sin ωt products. In discrete time the calculation is $$\text{PHASE ERROR} = \frac{1}{n}\sum_{i=0}^{n-1} u'_{C_t}(k+i)\sin\frac{2\pi i}{n},$$

where $$\sin\frac{2\pi i}{n}$$

is stored in the form of a table of constants. By synchronizing the operation of ADC 34 with PWM 42, the phase detection algorithm in phase detector 38 is simplified.

FIGS. 4 and 5 illustrate two alternative examples of sampling the capacitor voltage of the wireless charging transmitter of FIG. 1. Voltage $u_{m2}$ might be sampled in multiple ways, but one beneficial way is to exploit the possibility of triggering of ADC 34 by PWM 42 to obtain evenly distributed samples in each PWM period as illustrated in FIG. 4. The phase detection algorithm of phase detector 38 will be time independent this way, which allows for simplification of the calculations. Depending on the capabilities of MCU 32 and ADC 34, all samples can be acquired each PWM period and processed in response to a single Interrupt Service Routine (ISR) as illustrated in FIG. 4. In FIG. 4 and FIG. 5, the variable k represents the number of samples.

FIG. 5 illustrates another example embodiment of sampling the capacitor voltage of the wireless charging transmitter of FIG. 1. In FIG. 5, one sample is acquired every PWM period and all samples processed when they are available. It is also possible to use Direct Memory Access (DMA) to store samples from multiple PWM periods to memory and use average filtering to improve precision. The embodiment of FIG. 5 may be implemented in transmitters having less processing power than that required to implement the embodiment of FIG. 4. As shown in FIG. 3, the phase of the first harmonics of inverter output voltage $u_A$–$u_B$ is shifted by half of phase shift. To prevent this phase shift from affecting the rest of the phase detection algorithm, the sampling time of all samples can be delayed by half of actual phase shift as illustrated in FIG. 5. This delay may be set every frequency control ISR.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims. Generally, in a metal-oxide semiconductor (MOS) transistor of the above described embodiment, a source or drain may be referred to as a current electrode and a gate may be referred to as a control electrode. Other transistor types may be used in other embodiments.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A wireless charging transmitter comprising:
    a phase-shift controlled inverter having an input for receiving a phase-shift signal, and first and second output terminals for providing an inverter output voltage;
    a capacitor having a first terminal coupled to the first output terminal of the phase-shift controlled inverter, and a second terminal;
    a coil having a first terminal coupled to the second terminal of the capacitor, and a second terminal coupled to the second terminal of the phase-shift controlled inverter; and
    a control circuit having an input coupled to the second terminal of the capacitor for sampling a capacitor voltage of the capacitor, the control circuit determining a phase error of the capacitor voltage relative to a phase of an inverter output voltage, and an output for providing the phase-shift signal corrected for the phase error.

2. The wireless charging transmitter of claim 1, wherein the phase-shift controlled inverter is characterized as being a phase-shift controlled full bridge inverter comprising metal-oxide semiconductor (MOS) transistors.

3. The wireless charging transmitter of claim 1, further comprising a level shifter having an input coupled to the second terminal of the capacitor, and an output for providing a level shifted capacitor voltage.

4. The wireless charging transmitter of claim 3, wherein the level shifter level shifts the capacitor voltage to have a lower amplitude.

5. The wireless charging transmitter of claim 4, wherein the control circuit comprises:
   an analog-to-digital converter having an input coupled to receive the level shifted capacitor voltage, and an output for providing a digital representation of the level shifted capacitor voltage;
   a phase error detector having an input coupled to the output of the analog-to-digital converter, the phase error detector determining the phase error of the capacitor voltage relative to the phase of the inverter output voltage;
   a proportional-integral (PI) controller having an input coupled to the output of the phase error detector, and an output for providing a phase error control signal; and
   a pulse width modulation (PWM) circuit having a first input for receiving an input signal, a second input coupled to the output of the PI controller for receiving the phase error control signal, and an output for providing the phase-shift signal corrected for the phase error.

6. The wireless charging transmitter of claim 5, wherein the analog-to-digital converter is used to sample the digital representation of the level shifted capacitor voltage one of either 8 or 16 times per a PWM period.

7. The wireless charging transmitter of claim 1, wherein the capacitor voltage is sampled and the phase error determined dynamically during operation of the wireless charging transmitter.

8. The wireless charging transmitter of claim 1, wherein the phase error is zero when a phase difference between the capacitor voltage and the inverter output voltage is 90 degrees.

9. The wireless charging transmitter of claim 1, wherein the control circuit is implemented in a microcontroller unit (MCU).

10. A wireless charging transmitter comprising:
    a phase-shift controlled full bridge inverter having an input for receiving a phase-shift signal, and first and second output terminals for providing an inverter output voltage;
    a capacitor having a first terminal coupled to the first output terminal of the phase-shift controlled full bridge inverter, and a second terminal;
    a coil having a first terminal coupled to the second terminal of the capacitor, and a second terminal coupled to the second terminal of the phase-shift controlled inverter;
    a voltage level shifting circuit having an input coupled to the second terminal of the capacitor, and an output for providing a level shifted capacitor voltage; and
    a control circuit having an input coupled to the second terminal of the voltage level shifting circuit for sampling the level shifted capacitor voltage, the control circuit determining a phase error of the capacitor voltage relative to a phase of an inverter output voltage, and an output for providing the phase-shift signal corrected for the phase error.

11. The wireless charging transmitter of claim 10, wherein the control circuit comprises:
    an analog-to-digital converter having an input coupled to receive the level shifted capacitor voltage, and an output for providing a digital representation of the level shifted capacitor voltage;
    a phase error detector having an input coupled to the output of the analog-to-digital converter, the phase error detector determining the phase error of the capacitor voltage relative to the phase of the inverter output voltage;
    a proportional-integral (PI) controller having an input coupled to the output of the phase error detector, and an output for providing a phase error control signal; and
    a pulse width modulation (PWM) circuit having a first input for receiving an input signal, a second input coupled to the output of the PI controller for receiving the phase error control signal, and an output for providing the phase-shift signal corrected for the phase error.

12. The wireless charging transmitter of claim 11, wherein the analog-to-digital converter samples the digital representation of the level shifted capacitor voltage one of either 8 or 16 times per a PWM period.

13. The wireless charging transmitter of claim 10, wherein the capacitor voltage is sampled and the phase error determined dynamically during operation of the wireless charging transmitter.

14. The wireless charging transmitter of claim 10, wherein the phase error is zero when a phase difference between the capacitor voltage and the inverter output voltage is 90 degrees.

15. The wireless charging transmitter of claim 10, wherein the control circuit is implemented in a microcontroller unit (MCU).

16. A method for operating an inductive wireless charging transmitter in resonance, the inductive wireless charging transmitter comprising a phase-shift controlled full bridge inverter for switching an input signal to a transmitter coil and a capacitor coupled together in series, the method comprising:
    sampling the capacitor voltage using an analog-to-digital converter to produce a plurality of samples;
    determining a phase error of the capacitor voltage using the plurality of samples; and
    correcting a phase of the input signal using the phase error and providing the phase corrected input signal to be used by the phase-shift controlled full bridge inverter.

17. The method of claim 16, further comprising level shifting the capacitor voltage before sampling the capacitor voltage with the analog-to-digital converter.

18. The method of claim 16, wherein the method is performed dynamically during operation of the wireless charging transmitter.

19. The method of claim 16, wherein the phase error is zero when a phase difference between the capacitor voltage and the inverter output voltage is 90 degrees.

20. The method of claim 16, further comprising averaging the plurality of samples before determining the phase error of the voltage using the plurality of samples.

* * * * *